United States Patent [19]

Coffelt et al.

[11] Patent Number: 5,121,635

[45] Date of Patent: Jun. 16, 1992

[54] FRUIT SIZER

[75] Inventors: Robert A. Coffelt, Edinburg, Va.; Tracy J. Kahl, San Jose, Calif.; John A. Low, Maurertown, Va.

[73] Assignee: Agri-Tech Incorporated, Va.

[21] Appl. No.: 513,271

[22] Filed: Apr. 20, 1990

[51] Int. Cl.$^5$ .................... G01B 21/12; B65G 47/24
[52] U.S. Cl. ........................ 73/627; 73/865.8; 356/385; 198/385; 209/510
[58] Field of Search ............... 73/865.8, 852, 849, 73/627; 356/385, 55, 56, 57; 209/510; 198/373, 382, 383, 385, 387

[56] References Cited

U.S. PATENT DOCUMENTS

| | | | |
|---|---|---|---|
| 2,913,028 | 11/1959 | Hait | 198/385 |
| 3,277,940 | 10/1966 | Henderson et al. | 198/387 |
| 3,602,281 | 8/1971 | Anderson et al. | 198/385 |
| 4,687,107 | 8/1987 | Brown et al. | 356/385 |
| 4,730,719 | 3/1988 | Brown et al. | 198/387 |

Primary Examiner—Hezron E. Williams
Assistant Examiner—Rose M. Finley
Attorney, Agent, or Firm—Foley & Lardner

[57] ABSTRACT

An apparatus for handling an object such as fruit having a major axis, includes at least one roller and a drive unit. The roller frictionally engages the object. The drive unit rotates the roller at a speed sufficient to cause the major axis of the object to be reoriented in a predetermined direction. This facilitates measuring the size and density of objects in a consistent manner.

18 Claims, 4 Drawing Sheets

FRUIT SIZER

BACKGROUND OF THE INVENTION

The invention relates to fruit and vegetable sizing. More specifically, the invention relates to reorienting a piece of fruit or a vegetable along a particular axis and then determining the size of the piece of fruit or vegetable using sound waves.

Sizing and sorting fruit and vegetables is labor-intensive, and thus expensive. Different devices for sorting and sizing fruit are summarized in "Automated Inspection/Classification of Fruits and Vegetables" by Dr. W. M. Miller, *Transactions of the* 1987 *Citrus Engineering Conference*, sponsored by the Florida Section of the ASME (Vol. XXXIII, pp. 42–52, Mar. 26, 1987); "Automated Density Separation for Freeze-Damaged Citrus" by W. M. Miller et al., *Applied Engineering in Agriculture*, (Vol. 4, No. 4, pp. 344–348, 1988); "Computer-Based Inspection of Freeze-Damaged Citrus" by W. M. Miller et al., ASAE Paper 86-6554 (December 1986); and "Mechanical and Physical Properties for Postharvest Handling of Florida Citrus" by W. M. Miller, *Proc. Fla. State Hort. Soc.*, (99:122–127, 1986).

In order to reduce the complexity and cost of a fruit or vegetable sizer, measurements in two dimensions are frequently used to estimate the three-dimensional volume of a fruit or vegetable. Unfortunately, since fruit or vegetables are frequently irregular or non-spherical in shape, the use of only two dimensions to estimate the volume results in errors in the volume calculation. These errors in the volume calculation would be introduced in any calculations which depend on volume information, such as density calculations.

A method of reorienting fruit such that the major, intermediate, and minor axes of the fruit are oriented in predetermined directions, prior to being presented to dimension determining sensors, would minimize errors in volume calculation. Reorienting the fruit would also make the mechanical handling of the fruit less troublesome. In addition, reorienting the fruit would provide more accurate size sorting since size sorting is conducted according to the largest dimension of the fruit.

U.S. Pat. No. 4,380,294, issued to Morris on Apr. 19, 1983, discloses an apparatus for sorting fruits according to size. This device uses two belts moving at different speeds to reorient fruit. Unfortunately, this two-belt arrangement is mechanically complicated.

U.S. Pat. No. 4,091,931, issued to Button et al. on May 30, 1978, discloses a fruit-sorting apparatus which uses rollers to facilitate the positioning of tomatoes in pockets. This apparatus does not positively reorient fruit along a desired axis.

A method of ascertaining a particular dimension or other information regarding a piece of fruit involves the use of optical devices such as a line scan camera. Optical sensors are disclosed, for example, in U.S. Pat. No. 4,726,898, issued to Mills et al. on Feb. 23, 1988, and U.S. Pat. No. 4,122,951, issued to Alaminos on Oct. 31, 1978. Unfortunately, optical devices are expensive and tend to be troublesome in the harsh environments in which sizers must operate since optical devices must be kept clean in order to function properly. The level of cleanliness required for optical devices is difficult to maintain in a packing house.

Sound has been used in various sorting or sizing operations. For example U.S. Pat. No. 774,840, issued to Turner on Oct. 4, 1988, discloses a system for detecting the height of a stream of cigarettes using sound. U.S. Pat. Nos. 4,576,286, 4,557,386, and 4,690,284, all issued to Buckley et al., disclose sorting parts using acoustic energy. U.S. Pat. No. 3,435,950, issued to Suverkrop on Apr. 1, 1969, discloses a material separation device which uses sound to determine whether an object is a potato or a clod of dirt. U.S. Pat. No. 4,249,660, issued to Woodland on Feb. 10, 1981, uses sound to identify voids in potatoes. U.S. Pat. No. 3,254,888, issued Jun. 7, 1966 to Street, discloses a device which uses sound to determine if sheets of paper are overlapped. None of these patents disclose a simple device for determining the size of fruits or vegetables using sound.

SUMMARY OF THE INVENTION

It is an object of the invention, therefore, to provide a simple apparatus for reorienting a fruit, vegetable, or other object.

It is another object of the invention to provide a fruit or vegetable sizer which can operate effectively in a harsh environment.

It is another object of the invention to provide an apparatus which measures the dimension of a fruit or vegetable using sound.

According to a first aspect of the invention, there is provided an apparatus for handling an object, such as a piece of fruit or vegetable, having a major axis. The apparatus includes at least one roller frictionally engaging the object and a drive unit connected to the roller. The drive unit rotates the roller at a speed sufficient to cause the major axis of the object to be reoriented in a predetermined direction.

The apparatus may also include a transmitter for directing a sound wave at the object as a first sound wave and a receiver for receiving a reflection of the first sound wave off the object as a second sound wave. A circuit then measures the time interval between transmission of the first sound wave and reception of the second sound wave in order to determine a dimension of the object.

In a preferred embodiment, the apparatus includes two rollers, each roller frictionally engaging the object.

BRIEF DESCRIPTION OF THE DRAWINGS

The invention will be described in further detail below with reference to the following drawings.

DETAILED DESCRIPTION OF THE PREFERRED EMBODIMENTS

Figure 1:
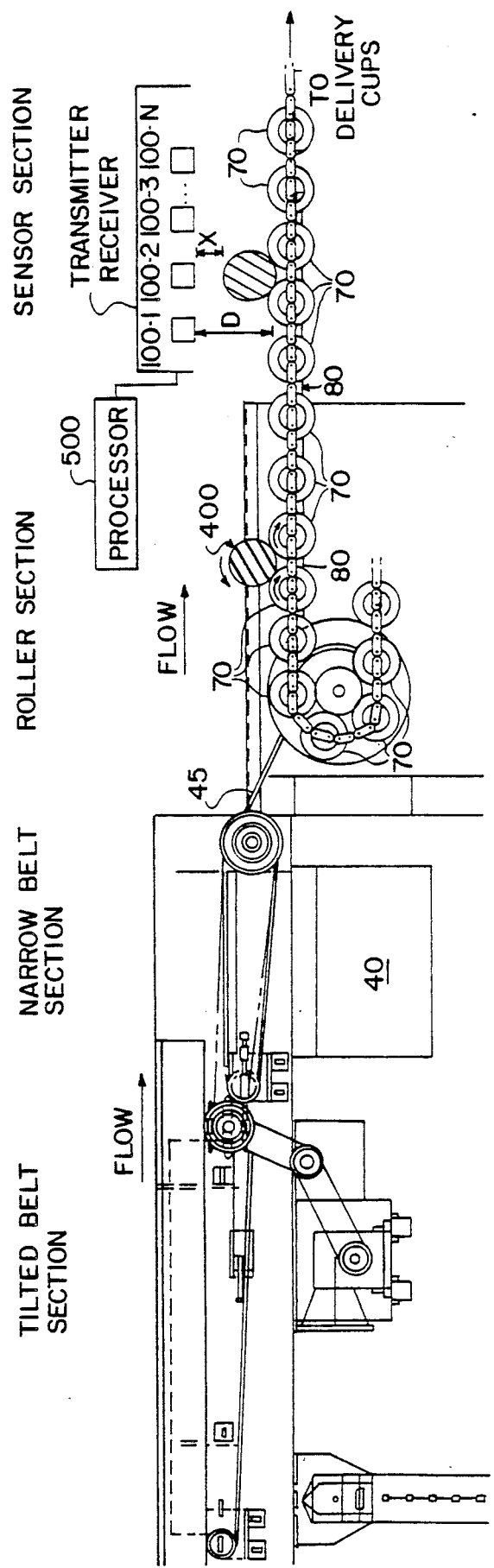
FIG. 1 illustrates a side view of a preferred embodiment of the invention.
Figure 2:
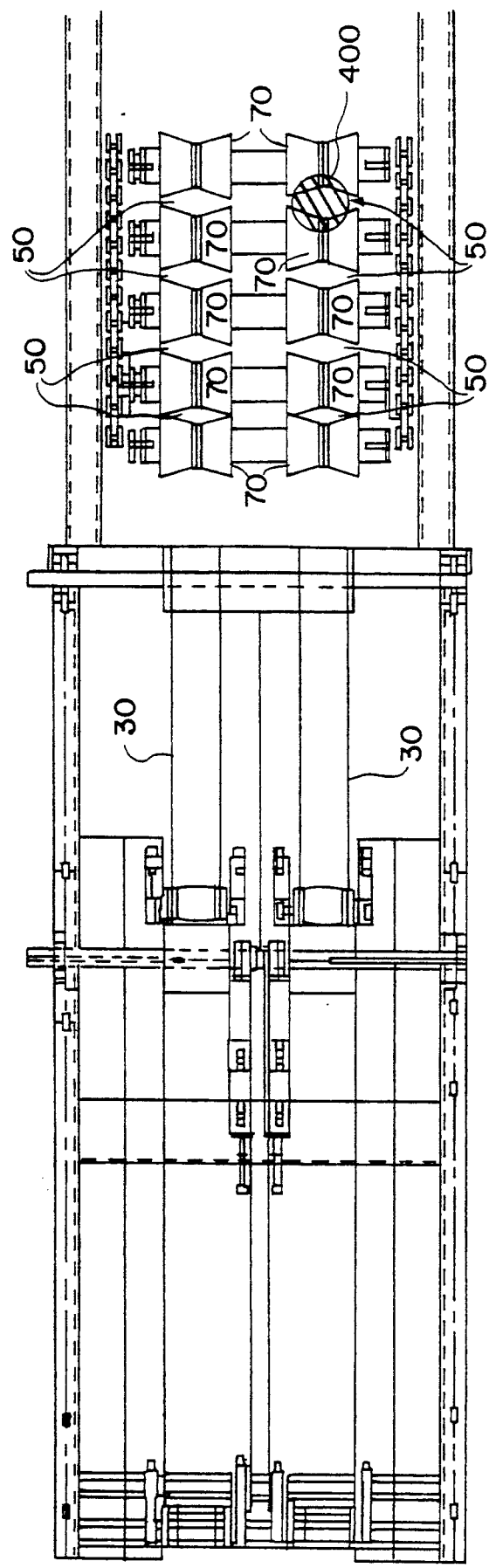
FIG. 2 illustrates a top view of a portion of the preferred embodiment illustrated in FIG. 1.
Figure 3:
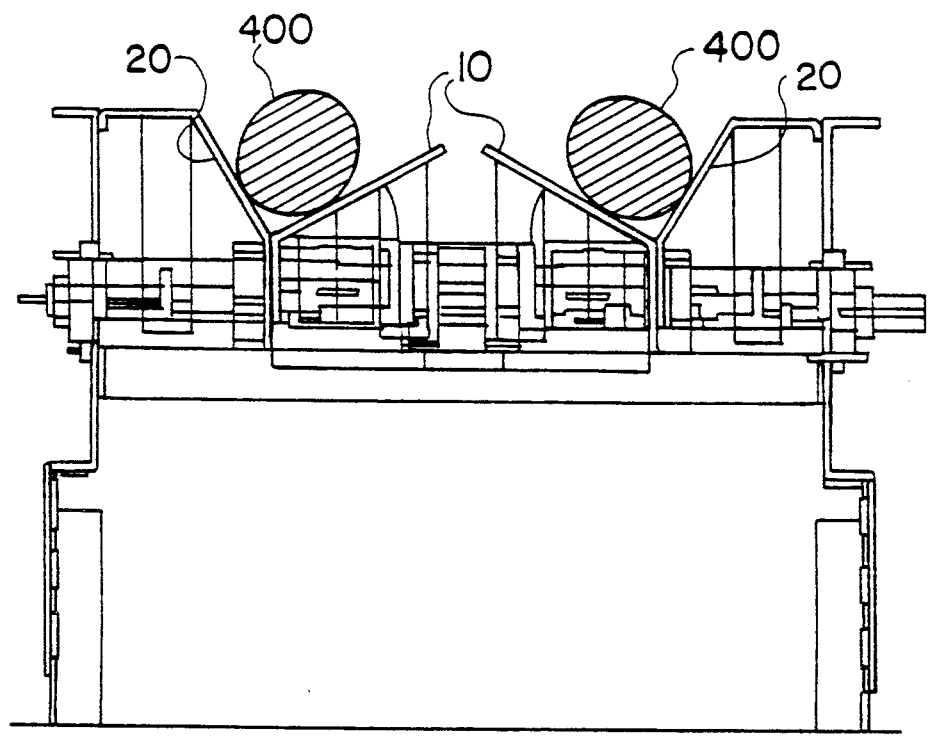
FIG. 3 illustrates an end view of the tilted belt section illustrated in FIG. 1.

FIGS. 1–4 illustrate a preferred embodiment of the instant invention. As illustrated in FIG. 1, the preferred embodiment includes four sections, a tilted belt section, a narrow belt section, a roller section, and a sensor section. Fruit 400 travels from the tilted belt section to the sensor section and then, for example, to delivery cups (not shown). As may be seen from FIG. 2, the preferred embodiment includes two lanes of similar construction. A single lane may be used instead of two lanes, or alternatively, more than two lanes may be used.

Fruit, such as citrus fruits, or vegetables, enter the tilted belt section and are picked up by a four-inch wide flat belt 10. The flat belt 10 moves in the direction of flow illustrated in FIG. 1. As may be seen from FIG. 3, one edge of the belt 10 tilts up as the belt travels from left to right so that the fruit ends up in a valley between the belt 10 and a fixed side molding 20. This design causes the fruit to roll along the molding, as the belt 10 pulls the fruit along, causing any fruit that is stacked-up to be forced into a single line.

From the tilted belt section, the fruit is transferred to the narrow belt section. The narrow belt section includes a narrow belt 30 which has a slight concave profile. The belt speed of narrow belt 30 is adjusted to feed the roller, or grommet, section downstream of the narrow belt section, without placing more than one piece of fruit into roller valleys 50. The belt 30 runs slower for small fruit and faster for larger fruit. Each belt 30 is narrow so that it can only hold a single line of fruit. If the tilted belt section feeds more fruit than the narrow belt section can handle, at its set speed, the extra fruit falls off into bin 40 to be recycled. Both the tilted belt 10 and the narrow belt 30 are driven by a series of pulleys and belts which are ultimately driven by a motor (not shown).

After the fruit is lined-up in the narrow belt section, the fruit is discharged from the narrow belt section to the roller section via ramp 45. The roller section includes a plurality of rollers 70. The rollers 70 may also be called grommets. A roller is an approximately cylindrically shaped structure which is rotated about its longitudinal axis. Each of the rollers 70 is bow-tie shaped in the preferred embodiment, however, other shapes can be used. The rollers can be fabricated from rigid materials or they can be fabricated from molded foam to minimize bouncing of the fruit. Adjacent rollers form valleys 50 in which the fruit sits.

The valleys 50 between the rollers 70 pick up the fruit and transport the fruit downstream to a series of sensors 100. The locations of valleys 50 are synchronized with both the sensors 100 and with positions of main carrier cups (not shown) located downstream of sensors 100. The plurality of rollers 70 form a continuous belt of rollers moving in the clockwise direction. That is, each of the rollers 70 moves to carry fruit toward the sensors as each roller spins. In FIG. 1, a portion of this continuous belt of rollers is deleted for clarity.

Figure 4:
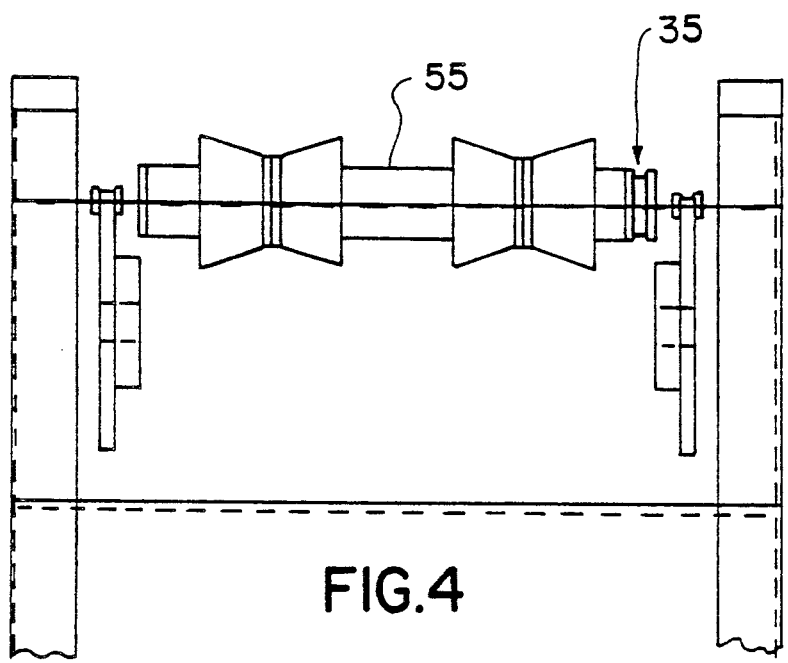
FIG. 4 illustrates an end view of the roller section illustrated in FIG. 1.

The individual rollers 70 spin as the continuous belt of rollers moves in the clockwise direction, since the rollers contact variable speed belt 80 at notch 35. As FIG. 4 shows, each roller 70 mounted side by side on a shaft 55 does not directly contact belt 80 and does not require a separate belt, since notch 35, located at an extreme end of shaft 55, acts under control of belt 80 to indirectly turn rollers 70 by turning the shaft. The rate at which the rollers spin is increased or decreased by adjusting the speed and/or direction of variable speed belt 80, which runs under the rollers 70. The variable speed belt 80 provides the means to drive the rollers 70. The direction and speed of the belt 80 controls the spin of the rollers 70 and therefore the spin of the fruit.

The spin of the rollers 70, and thus the spin of the fruit 400, is adjusted so that when the fruit is spun, it is forced to orient its largest diameter, or major axis, vertically.

The precise reason why spinning the fruit causes the major axis, or largest diameter, of the fruit to become reoriented in the vertical direction is not completely understood. It is believed that as each of the rollers 70 is spun, the fruit 400 reorients its major axis in the vertical direction in order to minimize the rotational inertia of the fruit. Regardless of the specific physical model used to explain the behavior of the fruit, tests confirm that when the fruit is spun at rates such as those discussed below, the fruit will become reoriented in a predetermined direction.

Figure 5A:
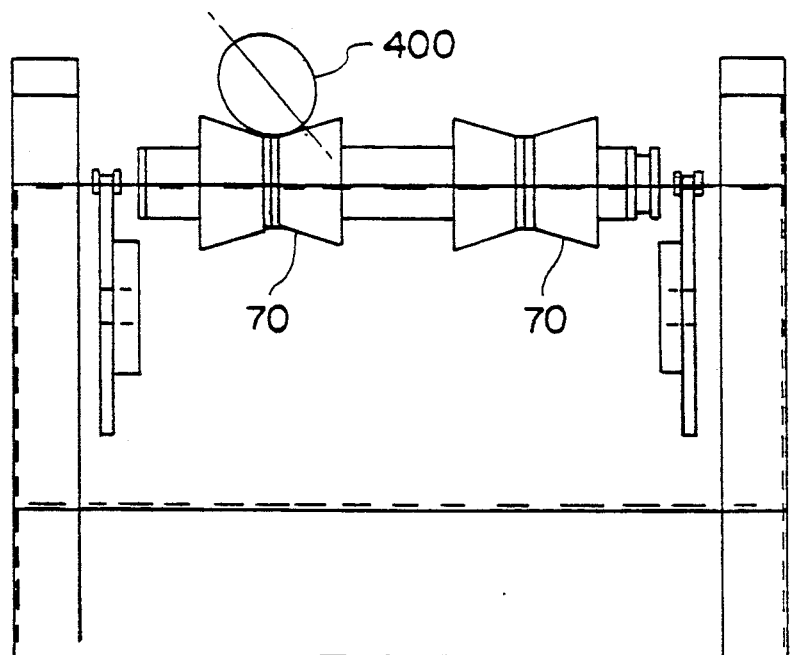
FIGS. 5(*a*) and 5(*b*) are used to illustrate how the invention reorients a piece of fruit in a predetermined direction.
Figure 5B:
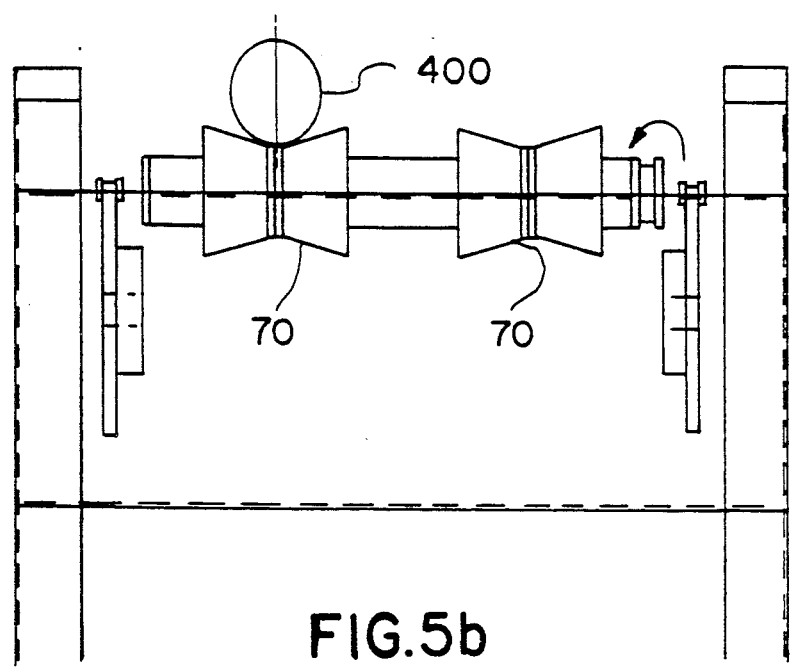

FIGS. 5(a) and 5(b) illustrate the reorientation of a piece of fruit 400 in a predetermined direction. FIG. 5(a) illustrates an irregularly shaped or non-spherical piece of fruit 400. Fruit 400 can be, for example, a grapefruit, which is typically ellipsoidal in shape. As illustrated in FIG. 5(a), the major axis of fruit 400 is lined-up in the non-vertical direction. As roller 70 rotates about its longitudinal axis, the fruit 400 becomes reoriented such that its major axis becomes lined-up in the vertical direction, as illustrated in FIG. 5(b). Thus, the roller section reorients the fruit 400 such that the fruit is presented in a consistent manner to the sensors 100 in the sensor section to allow accurate sizing.

After the fruit is reoriented in the roller section, the fruit is presented to a series of sensors 100-1, 100-2, ... 100-N in the sensor section for measurement. In the preferred embodiment, the sensors 100-1 through 100-N are ultrasonic sensors which transmit and receive sound waves. However, other types of sensors, such as laser sensors, can be used. Suitable ultrasonic sensors are available from Ocean Motion. The Ocean Motion sensor is an electrostatic-type sensor with a 50 KHz transmit frequency, and a 4.67 Hz repeat rate at 280 rods/min. Another suitable sensor is a sensor manufactured by Massa. The Massa sensor is a ceramic-type sensor with a 215 KHz transmit frequency, and a 4.67 Hz repeat rate at 280 rods/min.

The sensors 100, in conjunction with processor 500, determine the largest diameter of a piece of fruit by directing a sound wave at the fruit, and receiving the sound wave reflected off the piece of fruit with its major axis oriented vertically. The time that it takes for the sound wave to be transmitted, reflected off, and received in each of the sensors 100 is used to determine the distance X between a sensor and the piece of fruit. Since the distance D between the sensors and the valleys 50 is known, the diameter of the fruit is the difference between X and D. It will be known to those of ordinary skill that a predetermined relationship between the time intervals and the diameter of the fruit can also be arrived at either empirically, or analytically using the known speed of the transmitted sound wave. In addition, this relationship can be calculated in each instance or stored as entries in a memory. The time measurements and associated processing is performed by processor, or circuit, 500. A suitable processor is the Intel 8051 Microcontroller and associated circuitry. In the preferred embodiment, three to five sensors are used and the fruit dimensions determined from each of these sensors are averaged to obtain an average dimension for each piece of fruit for subsequent sorting by size, density, or the like.

In the preferred embodiment, the overall processing speed is 120 ft/min. The rotation speed or rate of spin of individual rollers 70 is approximately 120 rpm when belt 80 is not moving. The rotation speed of the individual rollers 70 can be varied from approximately 50 rpm to 200 rpm using a variable speed belt drive to achieve the optimum spin for a particular fruit, or the like.

Thus, the invention reorients irregularly shaped fruit in a mechanically simple manner and determines the dimension(s) of fruit using sound in an accurate manner.

The foregoing description has been set forth merely to illustrate preferred embodiments of the invention and is not intended to be limiting. For example, the invention is not limited to handling fruits and vegetables, but instead can be employed to handle and size other objects. Since modification of the described embodiments incorporating the spirit and substance of the invention may occur to persons skilled in the art, the scope of the invention should be limited solely with respect to the appended claims and equivalents.

What is claimed is:

1. An apparatus for handling an object having a major axis, said apparatus comprising:
    a first roller frictionally engaging said object;
    a drive means, connected to drive said first roller, for rotating said first roller at a speed causing said major axis of said object to be reoriented in a predetermined direction, said drive means being disposed on said apparatus to indirectly drive said first roller; and
    size measuring means for measuring the size of said object when said object is reoriented in said predetermined direction.

2. An apparatus as set forth in claim 1, wherein said predetermined direction is perpendicular to a longitudinal axis of rotation of said first roller.

3. An apparatus as set forth in claim 1, further comprising:
    at least one receiver receiving a sound wave at said object as a first sound wave;
    at least one receiver receiving a reflection of said first sound wave off said object as a second sound wave; and
    a circuit measuring a time interval between transmission of said first sound wave and reception of said second sound wave.

4. An apparatus as set forth in claim 1, further comprising:
    a transmitter directing a sound wave at said object in a first direction as a first sound wave;
    a receiver receiving a reflection of said first sound wave off said object as a second sound wave; and
    a circuit measuring a time interval between transmission of said first sound wave and reception of said second sound wave; and
    wherein said predetermined direction is perpendicular to a longitudinal axis of rotation of said first roller and said predetermined direction is parallel to said first direction.

5. An apparatus as set forth in claim 1, further comprising a second roller frictionally engaging said object at the same time said first roller is frictionally engaging said object, said second roller driven by said drive means.

6. An apparatus as set forth in claim 3, wherein the number of transmitters and receivers is at least two, and said transmitters and receivers are located at predetermined intervals for multiple measurements of time intervals corresponding to said object, and further comprising averaging means for averaging multiple time interval measurements.

7. A method of handling an object having a major axis, comprising the steps of:
    frictionally engaging said object with a first roller;
    rotating said first roller with a drive means indirectly driving said first roller at a speed causing said major axis of said object to be reoriented in a predetermined direction; and
    measuring the size of said object when said object is reoriented in said predetermined direction.

8. A method as set forth in claim 7, wherein said rotating step further comprises the step of:
    rotating said first roller such that said predetermined direction is perpendicular to a longitudinal axis of rotation of said first roller.

9. A method as set forth in claim 7, further comprising the steps of:
    directing a sound wave at said object as a first sound wave;
    receiving a reflection of said first sound wave off said object as a second sound wave; and
    measuring a first time interval between transmission of said first sound wave and reception of said second sound wave.

10. A method as set forth in claim 7, further comprising the steps of:
    directing a sound wave at said object in a first direction as a first sound wave;
    receiving a reflection of said first sound wave off said object as a second sound wave; and
    measuring a time interval between transmission of said first sound wave and reception of said second sound wave, said predetermined direction being perpendicular to a longitudinal axis of rotation of said first roller and said predetermined direction being parallel to said first direction.

11. A method as set forth in claim 7, further comprising the steps of:
    frictionally engaging said object with a second roller at the same time said first roller is frictionally engaging said object; and
    rotating said second roller indirectly with said drive means.

12. A method as set forth in claim 9, further comprising the steps of:
    directing a sound wave at said object as a third sound wave;
    receiving a reflection of said third sound wave off said object as a fourth sound wave;
    measuring a second time interval between transmission of said third sound wave and reception of said fourth sound wave; and
    averaging said first time interval and said second time interval to obtain an average time interval.

13. An apparatus as recited in claim 1, wherein said first roller is affixed to a shaft and said drive means is connected to rotate said shaft.

14. An apparatus as recited in claim 13, wherein said drive means comprises a moveable drive belt placed in contact with said shaft.

15. An apparatus as recited in claim 14, wherein said contact occurs at an extreme side of said shaft.

16. The apparatus recited in claim 14 wherein said contact between said belt and said shaft is made in a notch on said shaft.

17. The apparatus recited in claim 13, further comprising a plurality of rollers side by side on said shaft, said plurality of rollers being driven by the same driving means.

18. The apparatus recited in claim 17 comprising a plurality of said shafts driven by the same driving means.

* * * * *